United States Patent [19]

Fowler

[11] 3,833,815

[45] Sept. 3, 1974

[54] KRYPTON SOURCE

[75] Inventor: Ronald J. Fowler, Columbus, Ohio

[73] Assignee: The United States of America as represented by the Secretary of the Navy, Washington, D.C.

[22] Filed: Feb. 18, 1969

[21] Appl. No.: 800,837

[52] U.S. Cl............... 250/496, 89/1.5 D, 102/70.2, 250/498, 313/54, 313/224
[51] Int. Cl. .......................... H01j 17/20, F41f 5/02
[58] Field of Search...... 313/54, 224; 250/496, 498, 250/506; 89/1.5 D; 102/70.2

[56] References Cited
UNITED STATES PATENTS
3,026,436  3/1962  Hughes .............................. 313/54
3,110,811  11/1963  Kramish ............................. 313/54

Primary Examiner—T. H. Tubbesing
Assistant Examiner—S. C. Buczinski
Attorney, Agent, or Firm—R. S. Sciascia; P. Schneider; T. O. Watson, Jr.

[57] ABSTRACT

A radiation source for use in an arming system for airborne weapons comprising a stainless steel sphere filled with krypton-85 ($Kr^{85}$) radioactive gas at high pressure and having gold plated internal surfaces to form Bremsstrahlung targets which continuously emit gamma radiation when subjected to the beta radiation from the $Kr^{85}$. A depleted uranium ($U^{238}$) or tungsten shield surrounds the steel sphere and means are provided for pivoting part of the shield away from the steel sphere to permit the gamma radiation to escape and irradiate part of the path followed by a released bomb. The $Kr^{85}$ may be harmlessly dissipated in the atmosphere, if desired, by activation of an explosive squib fixed to a fill tube on the sphere.

10 Claims, 2 Drawing Figures

INVENTOR
RONALD J. FOWLER

BY Thomas O. Watson Jr.

ATTORNEY

KRYPTON SOURCE

STATEMENT OF GOVERNMENT INTEREST

The invention defined herein may be manufactured and used by or for the Government of the United States of America for Governmental purposes without the payment of any royalties thereon or therefor.

BACKGROUND OF THE INVENTION

This invention relates to radiation sources and more particularly to sources of gamma radiation which may be selectively activated to provide radiation in a predetermined pattern.

The arming of air launched weapons upon release from an aircraft has been the subject of considerable research in recent years. Devices employed by the various systems have the common objective of arming the weapon only after a safe intentional separation of the weapon and aircraft has occurred. Lanyards or arming wires attached to the aircraft and designed to be pulled free of the weapon upon separation to initiate an arming sequence were quite satisfactory for relatively low speed aircraft. The development, however, of jet aircraft capable of operating at near sonic and supersonic speeds complicated the problem. Not only were lanyards or arming wires subject to excessive stresses in flight, but subsequent to weapon launch, the lanyards or arming wires buffeted and frequently damaged the aircraft.

Electrical arming systems appeared to be an answer to the problem, but the manifold increase in numbers and power of radio and radar equipment, especially aboard aircraft carriers, caused these systems to be hazardous to explosive ordnance. These hazards were present even with mechanical lanyards or arming wires, as electromagnetic energy could gain access to explosives through electrical cabling used for control or selection, or through any openings in the weapon casing. A system was needed that could operate through a completely sealed and electrically shielded case, providing means for the selection of weapon options in addition to providing for arming of the weapon. Such a system would provide inherent immunity to the serious hazards of electromagnetic radiation to ordnance.

SUMMARY OF THE INVENTION

The present invention obviates the aforementioned shortcomings of the prior art by providing a shielded spherical shell filled with a radioactive isotope ($Kr^{85}$) and provided with interior gold plated surfaces to constitute Bremsstrahlung targets whereby, upon selective displacement of a portion of the shield, the sphere becomes a source of gamma radiation. Because of the penetrating ability of gamma radiation, the skin of the weapon to be armed may possess complete mechanical integrity which provides inherent immunity of the explosive to the hazards of high power electromagnetic radiation. The weapon is provided with a radiation detector, such as a Geiger-Mueller tube, together with circuitry for initiating the arming or fuzing sequence upon detection of the gamma radiation signal. The circuitry is such that normal background radiation falls far below its threshold of response.

The present invention posesses numerous other advantages not found in the prior art. The radiation source units of the present invention are self-destructive in the case of fire or extreme shock, as well as susceptible to destruction upon pilot command through the explosive squib, and are thus extremely safe in a radiological sense as compared to solid radiation sources. Rupture of the source capsule permits the $Kr^{85}$ to rapidly dissipate in the atmosphere to a harmless concentration. This accidental or deliberate dissipation of the radiation source also renders the source "safe" in a political sense. Present electromechanical arming systems require cable and connector rigging which consumes a considerable amount of time for the loading and checking of stores and also pose the problems associated with external wires and cables at supersonic and near-supersonic speeds. This rigging procedure adds to the turn-around time of the aircraft and therefore limits aircraft mission time. On the other hand, an arming system utilizing the present invention as the arming signal source requires absolutely no mechanical or electrical attachments, adjustments or alignments to be made. Once the weapon containing the detector circuitry has been attached to the bomb rack, it is ready to operate.

OBJECTS OF THE INVENTION

It is a primary object of this invention to provide a new and improved radiation source.

It is another object of this invention to provide a new and improved source of gamma radiation.

It is a further object of this invention to provide a new and improved source of gamma radiation; the emission of which may be controlled.

It is yet another object of this invention to provide a new and improved source of gamma radiation which may be selectively activated to produce a directionally controlled beam of radiation.

It is a still further object of this invention to provide a radiation source which may be mounted on an aircraft and selectively activated to initiate an arming sequence in a weapon dropped from the aircraft after a predetermined separation.

BRIEF DESCRIPTION OF THE DRAWING

Other objects, advantages and novel features of the invention will become readily apparent upon consideration of the following detailed description when read in conjunction with the accompanying drawing wherein.

DESCRIPTION OF THE PREFERRED EMBODIMENT

Figures 1, 2:
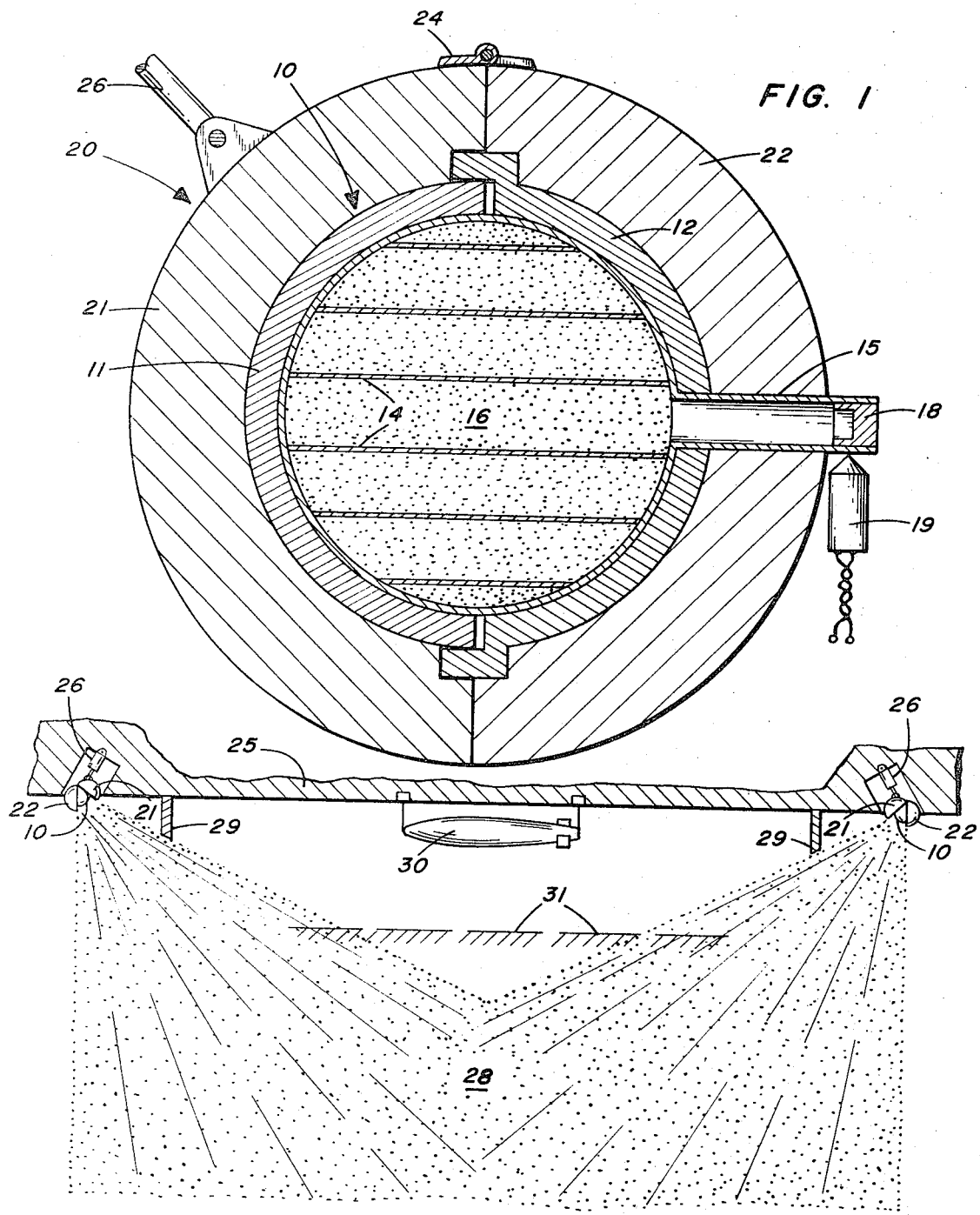
FIG. 1 is a sectional view of the radiation source of the present invention illustrating the principal features thereof.
FIG. 2 is a view illustrating a pair of the radiation sources of the present invention mounted on the bottom of an aircraft and shows the pattern of irradiation through which the bomb will fall.

Attention now is directed to the drawing, wherein like numerals of reference designate like parts throughout the several views and wherein is disclosed a spherical container, designated generally by the reference numeral 10, which constitutes the radiation source of the present invention. The sphere 10 is formed of two hemispheres 11 and 12 (FIG. 1) joined at their edges and made of stainless steel or other suitable material. A plurality of thin plates 14, of tungsten, or other suitable material, are disposed within the sphere 10 and brazed or otherwise secured to the hemispheres 11 and 12. The plates 14, as well as the interior surfaces of the hemispheres 11 and 12, are all provided with a thin plating of a heavy metal, such as gold, to provide a large area of Bremsstrahlung targets. Other heavy metals, i.e., those with large atomic weights, may be used in place of gold as long as they are such that they emit gamma rays upon being subjected to beta radiation.

The sphere 10 is provided with a fill tube 15 which is secured to and positioned in an aperture in the hemisphere 12. The sphere 10 is charged with a gaseous radioactive isotope 16, such as krypton 85 ($Kr^{85}$), and is hermetically sealed by means of a closure plug 18. The sphere 10 is charged to a relatively high pressure, on the order of 100 itmospheres, to insure a sufficient quantity of the isotope 16 in a relatively small volume. To enable the isotope 16 to completely fill the interior of the sphere 10, the plates 14 are provided with apertures, not shown. Other gaseous radioactive substances, such as radioactive isotopes of other inert gases, may also be used as long as they are beta emitters and posess a reasonably long half-life. The source 10 is also provided with an explosive destruct squib 19 fixed to the fill tube 15 and operable upon energization to shear the end of the fill tube and permit the gaseous isotope to dissipate harmlessly in the atmosphere.

In order to preclude radiation from the source at other than the desired times, a shielding sphere, designated generally by the reference numeral 20, is provided. The sphere 20 is comprised of hemispheres 21 and 22 and may be constructed of depleted uranium ($U^{238}$), tungsten, or other suitable material. The hemisphere 22 is bonded to the hemisphere 12 while the hemisphere 21 merely encompasses the hemisphere 11 when the source is inoperative. The hemisphere 21 is coupled to the hemisphere 22 by means of a hinge 24, by means of which the hemisphere 21 of the shield may be pivoted away from the source 10 to permit radiation to be emitted. When the hemisphere 21 is in the inoperative position, as shown in FIG. 1, substantially all the gamma radiation from the source 10 is absorbed by the shield 20.

Referring now to FIG. 2, there can be seen a pair of sources 10 and associated shields 20 fixed in their operative positions on the bottom 25 of the fuselage of an aircraft. The aircraft is provided with means, such as hydraulic cylinders 26, operable upon pilot command for pivoting the shielding hemispheres 21 away from the sources 10. When the hemispheres 21 are pivoted to the positions shown in FIG. 2, the sources 10 emit gamma radiation 28 in a pattern determined by the positions of the lower halves of the hemispheres 22 and a pair of semi-circular collimator rings 29 fixed to the fuselage of the aircraft.

OPERATION

The normal sequence of events would be a pilot command actuating the cylinders 26 to expose the sources 10 and permit the radiation 28 to irradiate a volume of space below a bomb 30 mounted on a rack on the fuselage or wings of an aircraft. The pilot would then release the bomb 30 at the desired time. In falling away from the aircraft, the bomb would be subjected to the radiation 28 which would activate the detector within the bomb to initiate the arming sequence. In normal flight operations, at times other than a bombing run, the sources 10 would be completely shielded. Thus, inadvertant dropping of the bomb 30, due perhaps to violent maneuvering of the aircraft or a mechanical failure of the bomb rack, would not result in the dropping of an armed bomb since there would be no radiation 28 to initiate the arming sequence. As an additional safety feature, the collimator rings 29 would be so sized and positioned that a plane 31, representative of the position of an airstrip or the flight deck of an aircraft carrier when the aircraft is resting on its landing gear, is never subjected to radiation from the sources 10. Thus, inadvertant dropping of the bomb 30 during loading would not result in initiation of the arming sequence, even if the sources 10 were exposed, which they normally would not be.

It is to be understood that the foregoing is simply descriptive of a preferred embodiment of the present invention which obviously posesses many ramifications. Numerous modifications may be readily devised by those skilled in the art to achieve a similar device which still embodies the principal features of applicant's invention and falls within the spirit and scope thereof.

What is claimed is:

1. A gamma radiation source comprising:
   a gas-tight container permeable to gamma radiation;
   a beta-radioactive gas within said container;
   a coating of a heavy metal on the internal surface of said container to define a Bremsstrahlung target which will emit gamma radiation upon being subjected to the beta radiation of said gas; and
   selectively operable means for destroying the gas-tight integrity of said container whereby said beta-radioactive gas may be dissipated harmlessly in the ambient atmosphere.

2. A gamma radiation source as defined in claim 1 having a selectively operable shield normally surrounding said container whereby emission of gamma radiation may be controlled.

3. A gamma radiation source as defined in claim 1 wherein a plurality of plates are disposed within said container and secured thereto, said plates also having a coating of a heavy metal thereon to provide additional Bremsstrahlung target area.

4. A gamma radiation source as defined in claim 1 wherein said container comprises a stainless steel sphere.

5. A gamma radiation source as defined in claim 1 wherein said beta-radioactive gas is krypton-85.

6. A gamma radiation source as defined in claim 1 wherein said heavy metal coating is gold.

7. A gamma radiation source as defined in claim 2 wherein said shield comprises a pair of depleted uranium ($U^{238}$) hemispheres coupled together by means of a hinge.

8. A gamma radiation source as defined in claim 2 wherein said shield comprises a pair of tungsten hemispheres coupled together by means of a hinge.

9. A gamma radiation source as defined in claim 2 wherein said beta-radioactive gas is krypton-85.

10. A gamma radiation source as defined in claim 2 wherein said heavy metal coating is gold.

* * * * *